United States Patent [19]
Kapphahn

[11] Patent Number: 5,528,855
[45] Date of Patent: Jun. 25, 1996

[54] FOLDABLE ARTIFICIAL MULCH COVER HAVING SLIT INSTALLATION FEATURE WITH INTACT PERIPHERY

[76] Inventor: John M. Kapphahn, Rte. 1, Box 85, Elbow Lake, Minn. 56531

[21] Appl. No.: 407,387

[22] Filed: Mar. 17, 1995

[51] Int. Cl.$^6$ ............................................ A01G 17/00
[52] U.S. Cl. ............................................................. 47/25
[58] Field of Search ............................ 47/25, 25 R, 9 S

[56] References Cited

U.S. PATENT DOCUMENTS

| | | |
|---|---|---|
| 104,418 | 6/1870 | Brunson . |
| 1,110,377 | 9/1914 | Cowles ................................ 47/25 R |
| 1,372,996 | 3/1921 | Eckart . |
| 1,931,602 | 10/1933 | Colman . |
| 2,017,308 | 10/1935 | Elmer . |
| 2,949,698 | 8/1960 | Downey et al. . |
| 3,005,287 | 10/1961 | Dudley . |
| 3,571,972 | 3/1971 | Carter, Jr. . |
| 3,727,347 | 4/1973 | Barnes ................................. 47/25 R |
| 4,590,705 | 5/1986 | Prince . |
| 4,986,025 | 1/1991 | Imperial . |
| 5,058,317 | 10/1991 | McMurtrey . |
| 5,065,543 | 11/1991 | Brook . |
| 5,085,001 | 2/1992 | Crawley . |

FOREIGN PATENT DOCUMENTS

| | | | |
|---|---|---|---|
| 2568447 | 2/1986 | France ................................. 47/25 R |
| 2832460 | 2/1980 | Germany ............................. 47/25 |
| 1381679 | 1/1975 | United Kingdom ................ 47/25 R |
| 2207845 | 2/1989 | United Kingdom ................ 47/25 |

*Primary Examiner*—Terry Lee Melius
*Assistant Examiner*—Joanne C. Downs
*Attorney, Agent, or Firm*—John R. Flanagan

[57] ABSTRACT

A foldable artificial mulch cover has a slit installation feature with an intact periphery. The cover includes a flexible flat sheet, a central opening defined in the sheet for passage of the stem of the plant, a slit defined in the sheet extending along a line passing through-the central opening in the sheet with each end of the slit terminating adjacent to but inwardly from a perimeter edge of the sheet, a plurality of paired apertures for the passage of U-shaped staples to secure the sheet to the ground, a fold line passing through the central opening with each end terminating at the perimeter edge of the sheet and being perpendicular to the slit, and a plurality of slots for the passage of water through the sheet. The slit so defined provides a continuous peripheral portion of the sheet surrounding the slit and extending between the opposite ends thereof and the perimeter edge of the sheet that remains in an intact condition while opening of the slit is permitted for facilitating the fitting of the sheet as a single piece over the plant and down around the stem of the plant to an installed position on the ground.

19 Claims, 1 Drawing Sheet

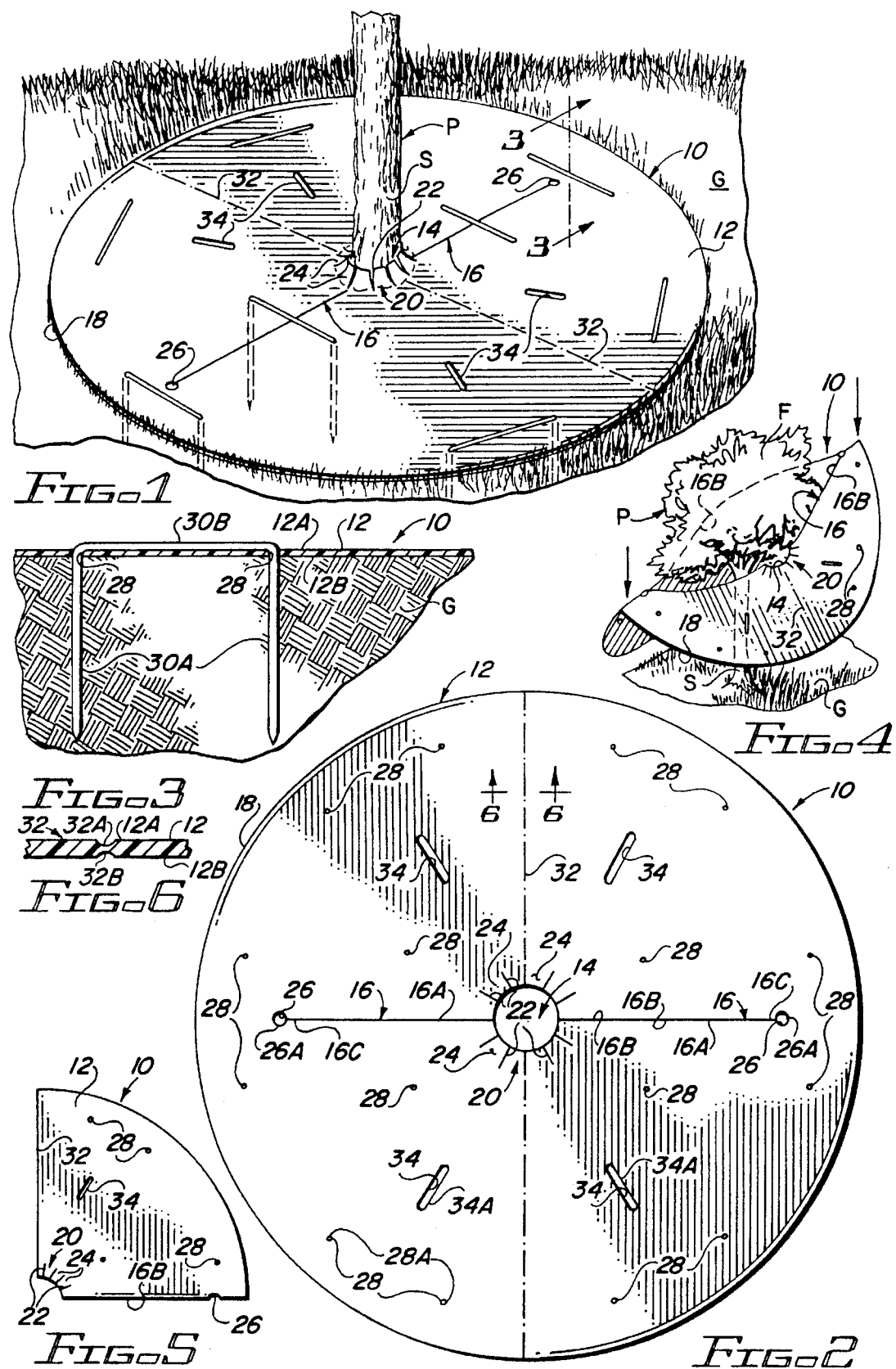

FOLDABLE ARTIFICIAL MULCH COVER HAVING SLIT INSTALLATION FEATURE WITH INTACT PERIPHERY

BACKGROUND OF THE INVENTION

Field of the Invention

The present invention generally relates to mulch sheets or skirts and, more particularly, is concerned with a foldable artificial mulch cover having a slit installation feature with an intact periphery.

Description of the Prior Art

Various mulches have long been used in the process of growing desired plants and controlling the growth of unwanted plants such as weeds. Mulches are generally placed over the soil around the stems of the desired plants. Mulches have been traditionally comprised of organic plant matter such as grass clippings and weeds. Various artificial mulches have also been developed to minimize the growth of weeds. A common form of artificial mulch is a sheet or skirt for covering the soil around the stem and over the roots of a growing desired plant. The sheet generally functions the same as organic plant mulches to enhance the growth of desired plants by blocking sunlight essential to the growth of unwanted plants and slowing down evaporation of water from the soil so as to retain more water near the roots of the desired plants.

Representative examples of artificial mulches in the form of sheets or skirts or a variation thereof are disclosed in U.S. Pat. No. 104,418 to Brunson, U.S. Pat. No. 1,931,602 to Colman, U.S. Pat. No. 2,017,308 to Elmer, U.S. Pat. No. 2,949,698 to Downey et al., U.S. Pat. No. 3,005,287 to Dudley, U.S. Pat. No. 3,571,972 to Carter, Jr., U.S. Pat. No. 4,590,705 to Prince, U.S. Pat. No. 4,986,025 to Imperial and U.S. Pat. No. 5,065,543 to Brook. A common feature in many of these mulch sheets or skirts is a central opening for receiving the stem of a plant and a slit extending from the opening to the periphery of the sheet to enable the sheet to be deformed so as to provide a passage by which the stem may be inserted into the opening. Problems exist, however, with these artificial mulches in that the sheets are sufficiently flexible to distort and curl up at the edges and the slit may cause a gap in the coverage provided by the sheet and thus cause portions of the soil surface to be susceptible to invasion by unwanted plants.

Other artificial mulch sheets or skirts have been developed to resolve the above mentioned problems which exist in the prior art. The flexible sheet or skirt may be stabilized by a metal or plastic ring extending about the periphery and anchor pins or spikes embedded in the ground to hold the ring and sheet in place. Examples of these stabilized mulch sheets or skirts are disclosed in U.S. Pat. No. 5,058,317 to McMurtrey and U.S. Pat. No. 5,085,001 to Crawley. A problem remains, however, in that the rings and anchor pins or spikes appear to make the mulch sheet unduly complex and costly to manufacture.

Consequently, a need still exists for an artificial mulch sheet or skirt which is designed to overcome the aforementioned problems in the prior art without also introducing new problems in their place.

SUMMARY OF THE INVENTION

The present invention provides an artificial mulch cover designed to satisfy the aforementioned need. The cover of the present invention is foldable and includes a slit installation feature with an intact periphery for fitting over the foliage and stem of a plant.

Accordingly, the present invention is directed to a mulch cover for installation around a stem of a plant. The cover comprises: (a) a flexible flat sheet having a perimeter edge; (b) means defining a central opening in the sheet for passage of the stem of the plant; (c) means defining a slit in the sheet extending along a line passing through the central opening in the sheet and having opposite portions extending in opposite directions from the central opening and defining opposite ends of the slit terminating adjacent to but spaced inwardly from the perimeter edge of the sheet so as to provide a continuous peripheral portion of the sheet surrounding the central opening and the slit in an intact condition while permitting the pulling apart of opposing portions of the sheet extending along opposite sides of the slit to cause, in effect, the enlarging of the size of the central opening in the sheet for facilitating the fitting of the sheet as a single piece over the plant and down around the stem of the plant to an installed position; and (d) means for securing the sheet to the ground in the installed position.

More particularly, the sheet is made substantially of any suitable plastic material that is resistant to UV-light, impervious to water and blocks or inhibits all plant growth thus including weeds and other unwanted plants from growing through the sheet. The central opening has a flexible collar defined thereabout. The collar has a plurality of segments spaced from each other and foldably connected to the sheet. The segments flex upwardly and downwardly relative to the plane of the sheet so as to permit the central opening to fit about a variety of plant stem sizes. Each end of the slit defined by the opposite portions thereof terminates in a tear-resistant hole so as to keep the peripheral portion of the sheet extending between the slit ends and the perimeter edge of the sheet unbroken and intact.

Also, the securing means includes a plurality of means defining paired apertures in the sheet and a plurality of U-shaped staples for removably fitting into the paired apertures to hold the sheet in place in the installed position on the ground.

Furthermore, the cover includes means defining a fold line passing through the central opening and having opposite ends terminating at the perimeter edge of the sheet and extending in relatively perpendicular relation to the slit. The flexibility of the sheet and the generally perpendicular arrangement of the slit and fold line therein divides the sheet into four quarters and allows the sheet to be folded generally into the four quarters for storage and transport. The flexibility of the sheet and presence of the central opening, slit and fold line in the sheet further enables the sheet to be manipulated, distorted and deflected temporarily into at least four angularly related planes for facilitating the fitting of the sheet as a single piece over the foliage and down around the stem of the plant. Finally, the resiliency of the sheet and arrangement of the central opening and slit also enables the sheet to return to its naturally flat state after installation around the stem of the plant.

Also, the cover further includes a plurality of means defining slots spaced between the central opening and the perimeter edge of the sheet for permitting the passage of water therethrough. The slots are generally arranged in a group of at least four oriented radially about the central opening. The slots allow the roots of the plant to receive water without exposing a substantial area for the unwanted plants to grow up therethrough.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of the mulch cover of the present invention in an installed position about a plant.

FIG. 2 is an enlarged top plan view of the mulch cover in an unfolded position.

FIG. 3 is an enlarged fragmentary cross-sectional view of the mulch cover with a U-shaped staple in the installed position taken along line 3—3 of FIG. 1.

FIG. 4 is a perspective view of the mulch cover in the process of being installed over and around the plant.

FIG. 5 is a top plan view of the mulch cover in a folded storage position.

FIG. 6 is an enlarged cross-sectional view of a fold indentation line formed in the mulch cover taken along line 6—6 of FIG. 2.

DETAILED DESCRIPTION OF THE INVENTION

Referring to the drawings and particularly to FIGS. 1 to 4, there is illustrated an artificial mulch cover, generally designated 10, of the present invention. The mulch cover 10 is generally designed for installation as a single piece around the stem S of a plant P such as an immature tree or bush or tomato plant.

Basically, the artificial mulch cover 10 includes a flexible flat sheet 12, means defining a central opening 14 in the sheet 12 for passage of the stem S of the plant P therethrough, and means defining a slit 16 in the sheet 12 extending, preferably diametrically, along a line passing through and bisecting the central opening 14 in the sheet 12 and having opposite portions 16A defined by pairs of opposite linear interior edges 16B extending in generally opposite directions from the central opening 14 and defining opposite ends 16C of the slit 16. The opposite ends 16C of the slit 16 terminate adjacent to but spaced inwardly from a perimeter edge 18 of the sheet 12 for facilitating the fitting of the sheet 12 over and downwardly about the plant P, as depicted in FIG. 4.

The flexible flat sheet 12 is preferably of circular shape and made of any suitable plastic material that is resistant to UV-light, impervious to water and blocks or inhibits all plant growth thus including weeds and other unwanted plants from growing through the sheet 12. As an alternative but less preferably, the sheet 12 may be made of a flexible water-resistant cardboard having a wax coating.

The central opening 14 in the sheet 12 is generally circular in shape and of a diameter size very small compared to the diameter of the sheet 12. The sheet 12 includes a flexible collar portion 20 defined about the central opening 14 therein. A plurality of cuts 22 are made in the collar portion 20 extending radially outwardly from the central opening 14 and being circumferentially spaced from one another so as to define a plurality of segments 24 between the cuts 22 being foldably or flexibly connected to the remaining portion of the sheet 12 surrounding the collar portion 20 thereof. The segments 24 thus can flex upwardly and downwardly relative to the plane of the sheet 12 so as to permit the central opening 14 to fit about a variety of plant stem sizes.

The central hole 14 and slit 16 so defined in the sheet 12 provide a continuous peripheral portion of the sheet 12 surrounding the central opening 14 and slit 16 and extending between the perimeter edge 18 and the opposite ends 16C of the slit 16 that will remain in an unseparated intact condition while permitting the gripping and pulling apart of opposing portions of the sheet 12 extending along opposite sides of the slit 16 to cause, in effect, the enlarging of the size of the central opening 14 or opening up of the slit 16, as illustrated in FIG. 4, for facilitating the fitting of the sheet 12 as a single piece over the plant P and any foliage F thereon and down around the stem S of the plant P to an installed position on the ground G around the plant P. Once the sheet 12 is place placed on the ground G and the pulling thereon is released, the resiliency of the sheet 12 will cause the slit 16 to close and the sheet 12 to return to a relative flat condition on the ground in the installed position.

Preferably, as seen in FIG. 2, each of the opposite ends 16B of the slit 16 terminates into a tear-resistant hole 26 so as to prevent unintended tearing of the sheet 12 at the opposite ends 16C of the slit 16 as the opposite portions of the sheet 12 along the opposite sides of the slit 16 are being pulled and held apart and the sheet 12 is being fitted over the plant P. This ensures that the continuous peripheral portion of the sheet 12 remains in the unbroken intact condition. The holes 26 are generally circular in shape and defined by an annular interior edge 26A.

The artificial mulch cover 10 also includes means for securing the sheet 12 to the ground G. The securing means preferably takes the form of a plurality of means defining paired apertures 28 in the sheet 12 and a plurality of rigid U-shaped staples 30 for removably fitting through the paired apertures 28 to secure and hold the sheet 12 in place on the ground G in an installed position, as shown in FIG. 1. The paired apertures 28 are generally formed in two groups in the sheet 12 and each is defined by an annular interior edge 28A. The apertures 28 in a first plurality or group thereof are defined adjacent to but spaced inwardly from the perimeter edge 18 of the sheet 12. The apertures 28 in a second plurality or group thereof are spaced in opposite directions from the central opening 14 between the first group and central opening 14 but relatively closer to the central opening 14 than to the perimeter edge 18 of the sheet 12. The apertures 28 in the pairs thereof of the second plurality are also defined on and spaced from opposite sides of the slit 16 in the sheet 12. Each of the apertures 28 in both pluralities is generally circular in shape and substantially smaller in size than the central opening 14.

Referring now particularly to FIG. 3, the plurality of U-shaped staples 30 are made of a substantially rigid material, such as steel, which enables the staples 30 to retain their U-shaped configuration after repeated use, that is, forced into and removed from the ground, in securing the sheet 12 to the ground G. The U-shaped staples 30 each have three interconnected segments including a pair of parallel side segments 30A and 30A substantially equal in length and extending in a relatively parallel relation to one another from opposite ends of a transverse end segment 30C which is relatively shorter in length and extends substantially perpendicular to the side segments 30A and 30B. The side and end segments 30A, 30B and 30C each have diameters which are substantially equal in size to one another and smaller in size relative to the diameters of the paired apertures 28 for fitting therethrough.

Referring now to FIGS. 1 and 2, 4 to 6, the sheet 12 further has means defining a fold line 32 extending along a line passing through the central opening 14 with each end terminating at the perimeter edge 18 of the sheet 12 and preferably being oriented in generally perpendicular relation to the slit 16. As best seen in FIG. 6, the fold line 32 is defined by a pair of indentations 32A, 32B made opposite one another in the top and bottom surfaces 12A, 12B of the sheet 12 so as to form a linear area of reduced thickness in the sheet 12.

The flexibility of the sheet 12 and arrangement of the slit 16 and fold line 32 enable the sheet 12 to be divided into quarters and folded into the four quarters for storage and transport, as shown in FIG. 5. These features enable the sheet 12 to be manipulated, distorted and deflected temporarily into at least four angularly related planes for fitting the sheet 12 as a single piece over the foliage F and down around the stem S of the plant P, as shown in FIG. 4. Finally, these same features plus the resiliency of the material of the sheet 12 enable the sheet 12 to return to its naturally flat state after installation around the stem S of the plant P as shown in FIGS. 1 and 2.

The sheet 12 further has a plurality of means defining slots 34 spaced between the central opening 14 and the perimeter edge 18 of the sheet 12 for permitting the passage of water therethrough. The slots 34 are defined by an oblong-shaped interior edge 34A and are generally arranged in a group of at least four oriented radially about the central opening 14. The slots 34 allow the roots of the plant P to receive water without exposing a substantial area for the unwanted plants to grow up therethrough.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A mulch cover for installation around a stem of a plant, said cover comprising:

(a) a flexible flat sheet having a perimeter edge;

(b) means defining a central opening in said sheet for passage of the stem of the plant; and (c) means defining a slit in said sheet extending along a line passing through said central opening in said sheet, said slit having opposite portions extending in generally opposite directions from said central opening and defining opposite ends of said slit with each of said opposite ends terminating in a tear-resistant hole defined in said sheet adjacent to but spaced inwardly from said perimeter edge of said sheet so as to provide a continuous peripheral portion of said sheet surrounding said central opening and said slit and extending between said perimeter edge and said tear-resistant holes at said opposite ends of said slit that remains in an intact condition while permitting the pulling apart of opposing portions of said sheet extending along opposite sides of said slit to cause, in effect, the enlarging of the size of said central opening in said sheet for facilitating the fitting of said sheet as a single piece over the plant and down around the stem of the plant to an installed position on the ground around the plant.

2. The cover of claim 1 further comprising:

a flexible collar portion in said sheet defined about said central opening therein, said collar portion having a plurality of segments spaced from each other and foldably connected to a portion of said sheet surrounding said collar portion thereof.

3. The cover of claim 2 wherein said segments of said collar portion flex upwardly and downwardly relative to the plane of said sheet so as to permit said central opening in said sheet to fit about a variety of plant stem sizes.

4. The cover of claim 1 wherein said sheet and said central opening are circular in shape.

5. The cover of claim 1 wherein said sheet is made substantially of a material which is impervious to water.

6. The cover of claim 1 further comprising:

means defining a fold line extending along a line passing through said central opening in said sheet and extending in opposite directions therefrom and having opposite ends terminating at said perimeter edge of said sheet, said fold line being oriented in a transverse relationship to said slit.

7. The cover of claim 1 further comprising:

a plurality of means defining slots spaced between said central opening and said perimeter edge of said sheet for permitting the passage of water therethrough.

8. A mulch cover for installation around a stem of a plant, said cover comprising:

(a) a flexible flat sheet having a perimeter edge;

(b) means defining a slit in said sheet extending along a line passing through a center of said sheet, said slit having opposite ends each terminating in a tear-resistant hole defined in said sheet adjacent to but spaced inwardly from said perimeter edge of said sheet so as to provide a continuous peripheral portion of said sheet surrounding said slit and extending between said perimeter edge of said sheet and said tear-resistant holes at said opposite ends of said slit that remains in an intact condition while opening of said slit in said sheet is permitted for facilitating the fitting of said sheet as a single piece over the plant and down around the stem of the plant to an installed position on the ground.

9. The cover of claim 8 further comprising:

means for securing said sheet to the ground in said installed position, said securing means including a plurality of means defining paired apertures in said sheet, and a plurality of U-shaped staples for removably fitting through said paired apertures to secure said sheet to the ground in said installed position.

10. The cover of claim 9 wherein a first said plurality of paired apertures are spaced adjacent to but inwardly from said perimeter edge of said sheet.

11. The cover of claim 10 wherein a second said plurality of paired apertures are spaced in opposite directions from said center of said sheet relatively closer to said center than to said perimeter edge of said sheet.

12. The cover of claim 11 wherein said apertures of said second plurality of paired apertures are spaced from opposite sides of said slit passing through said center of said sheet.

13. The cover of claim 8 wherein said sheet is circular in shape.

14. The cover of claim 8 wherein said sheet is made substantially of a material which is impervious to water.

15. The cover of claim 8 further comprising:

means defining a fold line extending along a line passing through said center of said sheet and having opposite ends terminating at said perimeter edge of said sheet, said fold line being oriented in a transverse relationship to said slit.

16. The cover of claim 8 further comprising:

a plurality of means defining slots spaced between said center and said perimeter edge of said sheet for permitting the passage of water therethrough.

17. A mulch cover for installation around the stem of a plant, said cover comprising:

(a) a flexible flat circular sheet having a perimeter edge;

(b) means defining a central circular opening in said sheet for passage of the stem of the plant;

(c) means defining a slit in said sheet extending along a line passing through said central circular opening in said sheet, said slit having opposite portions extending in generally opposite directions from said central circular opening and defining opposite ends of said slit terminating in tear-resistant holes defined in said sheet adjacent to but spaced inwardly from said perimeter edge of said sheet so as to provide a continuous peripheral portion of said sheet surrounding said central circular opening and said slit in an intact condition while permitting the pulling apart of opposing portions of said sheet extending along opposite sides of said slit to cause enlarging of the size of said central circular opening in said sheet for facilitating the fitting of said sheet as a single piece over the plant and down around the stem of the plant to an installed position on the ground around the plant;

(d) a plurality of means defining paired apertures in said sheet, a first said plurality of paired apertures defined adjacent to but spaced inwardly from said perimeter edge of said sheet and a second said plurality of paired apertures spaced in opposite directions from said central opening in said sheet between said central opening and said first said plurality of paired apertures, said apertures of said second plurality of paired apertures being spaced from said opposite sides of said slit;

(e) a plurality of U-shaped staples for removably fitting through said plurality of paired apertures to secure said sheet on the ground in said installed position;

(f) means defining a fold line in the sheet extending along a line passing through said central opening in said sheet and having opposite ends terminating at said perimeter edge of said sheet, said fold line being oriented in generally perpendicular relationship to said slit; and (g) a plurality of means defining slots oriented radially about and spaced between said central opening and said perimeter edge of said sheet for permitting the passage of water therethrough.

18. The cover of claim 17 further comprising:

a flexible collar portion in said sheet defined about said central opening therein, said collar portion having a plurality of segments spaced from each other and foldably connected to a portion of said sheet surrounding said collar portion thereof.

19. The cover of claim 18 wherein said segments of said collar portion flex upwardly and downwardly relative to the plane of said sheet so as to permit said central opening in said sheet to fit about a variety of plant stem sizes.

* * * * *